US008139165B2

(12) United States Patent
Abe et al.

(10) Patent No.: US 8,139,165 B2
(45) Date of Patent: Mar. 20, 2012

(54) TELEVISION RECEIVER (75) Inventors: Fumio Abe, Tokyo (JP); Isao Otsuka, Tokyo (JP); Kenichiro Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/515,072

(22) PCT Filed: Jul. 30, 2007

(86) PCT No.: PCT/JP2007/064865
§ 371 (c)(1),
(2), (4) Date: May 15, 2009

(87) PCT Pub. No.: WO2008/059640
PCT Pub. Date: May 22, 2008

(65) Prior Publication Data
US 2010/0053452 A1 Mar. 4, 2010

(30) Foreign Application Priority Data

Nov. 17, 2006 (JP) .................................. 2006-311438

(51) Int. Cl.
*H04N 5/14* (2006.01)
*H04N 5/60* (2006.01)

(52) U.S. Cl. ......................... 348/738; 348/632; 348/700

(58) Field of Classification Search .................. None
See application file for complete search history.

(56) References Cited

U.S. PATENT DOCUMENTS

| 6,449,021 | B1 | 9/2002 | Ohta et al. |
| 6,937,658 | B1 | 8/2005 | Suito et al. |

FOREIGN PATENT DOCUMENTS

| JP | 6-37563 A | 2/1994 |
| JP | 2000-165796 A | 6/2000 |
| JP | 2000-165807 A | 6/2000 |
| JP | 2002-77770 A | 3/2002 |
| JP | 2002-101002 A | 4/2002 |
| JP | 2002-112174 A | 4/2002 |
| JP | 2003-143544 A | 5/2003 |
| JP | 2006-67490 A | 3/2006 |

*Primary Examiner* — James R Sheleheda
*Assistant Examiner* — Rong Le
(74) *Attorney, Agent, or Firm* — Birch, Stewart, Kolasch & Birch, LLP

(57) ABSTRACT

It is an object of the present invention to provide a television receiver for discriminating a CM broadcast from a received television broadcast and controlling a volume of the CM broadcast without complicating a configuration of a discriminating process of the CM broadcast. The present invention includes a silence detection means, a scene change detection means, a video audio changing point detection means, a first characteristic amount extraction means, a second characteristic amount extraction means, a comparison determining means and a volume control means. The comparison determining means compares the first characteristic amount which is an audio characteristic amount of a television signal before the time when the video audio changing point is detected, and the second characteristic amount which is an audio characteristic amount of a television signal after the time when the video audio changing point is detected, to determine whether a predetermined condition is satisfied or not. The volume control means controls an output level when outputting audio of the television signal on the basis of a result of the comparison determining means.

8 Claims, 12 Drawing Sheets

TELEVISION RECEIVER

TECHNICAL FIELD

The present invention relates to a television receiver, and specifically relates to a television receiver for performing a volume control.

BACKGROUND ART

Television broadcasts including a commercial message broadcast are broadly divided into a "program main part broadcast" and a "commercial message broadcast" on the basis of their contents. In the case of a movie program, the program main part broadcast is a broadcast portion based on the video audio data of a movie content itself. On the other hand, the commercial message broadcast is a broadcast portion based on the video audio data supplied by a client such as an advertiser, an advertisement agent, or the like, who exchanges contracts with a broadcasting company. Furthermore, the commercial message broadcast includes a broadcast portion which is broadcasted by a broadcasting company in order to advertise and publicize its own company. The commercial message is generally abbreviated to CM, thus, it is also referred to as CM in the present application hereinafter.

This CM broadcast is generally produced with video and audio managed to attract viewer's attention in order to appeal an advertising claim effectively within a limited short period of such as fifteen seconds or thirty seconds. One of the ways is to start with music and a line of advertisement in a loud volume from the beginning of the CM broadcast.

However, it is considered that the scheme of the CM broadcast may provide a viewer who has concentrated on watching a program main part broadcast with displeasure at the CM broadcast which does not have anything to do with the content of the program main part broadcast suddenly starting with a loud volume. A volume of the CM broadcast may be heard considerably loud in the case of actually producing the CM broadcast with a louder volume than the program main part broadcast, or in the case where a scene immediately before switching to the CM broadcast is quiet because a dynamic range of a volume in the program main part broadcast is wide.

Therefore, a technique of lowering a volume by identifying with high precision a sudden loud volume of the CM broadcast or the like which gives a viewer displeasure is necessary in order to reduce a loud volume heard when switching from the program main part broadcast to the CM broadcast.

A conventional television receiver has detected an audio scheme of a television broadcast, and automatically discriminated a program main part and a CM broadcast to perform a volume control for lowering (e.g., lowering by 2 decibel) a volume only during the CM broadcast section (Patent document 1).

Another conventional television receiver has created database inside a digital broadcast receiving device for each CM broadcast program, and determined whether it is CM or not in real time when receiving a broadcast (Patent document 2). Further, another conventional television receiver has been provided with a CM discriminating means for using a result of a sound multiplex discriminating means for discriminating a stereophonic broadcast in a sound-multiplex broadcast to give a weight on a discriminating element of the CM broadcast (Patent document 3).

Patent document 1: Japanese Patent Application Laid-Open No. 2002-112174 (page 4, FIG. 1)
Patent document 2: Japanese Patent Application Laid-Open No. 2003-143544 (page 7, FIG. 1)
Patent document 3: Japanese Patent Application Laid-Open No. 2002-077770 (page 6, FIG. 1)

The television receiver according to Patent document 1 focuses on that an audio scheme of the CM broadcast tends to be a stereophonic broadcast, and discriminates the program main part which tend to be a monophonic broadcast or a bilingual broadcast and the CM broadcast. However, in a recent analog broadcast program and digital broadcast program such as a ground analog broadcast and BS/CS satellite broadcast, the program main part tends to be a stereophonic broadcast, so that it is getting difficult to identify the CM broadcast with preferable precision by the television receiver according to Patent document 1.

The television receiver according to Patent document 2 once stores a CM broadcast received for determining the CM broadcast inside the television receiver as CM data, and needs to determine a CM broadcast section on the basis of the CM data, so that a configuration of a discriminating process of the CM broadcast would be complicated.

Furthermore, the television receiver according to Patent document 3 combines conditions such as information of a broadcasting company of a guide channel or the like in addition to determination of an audio state to comprehensively discriminate whether it is the CM broadcast or not, so that a configuration of a discriminating process of the CM broadcast would be complicated.

DISCLOSURE OF INVENTION

An object of the present invention is to provide a television receiver for discriminating a CM broadcast from a received television broadcast, and controlling a volume of the CM broadcast without complicating a configuration of a discriminating process of the CM broadcast.

An aspect of a television receiver according to the present invention includes: silence detection means for detecting a silent part from an audio component of a received television signal; a scene change detection means for detecting a scene change part from a video component of the television signal; a video audio changing point detection means for detecting a time when the silent part and the scene change part are simultaneously detected, as a video audio changing point; a first characteristic amount extraction means for extracting and holding an audio characteristic amount of the television signal before the time when the video audio changing point is detected, as a first characteristic amount; a second characteristic amount extraction means for extracting and holding an audio characteristic amount of the television signal after the time when the video audio changing point is detected, as a second characteristic amount; a comparison determining means for comparing the first characteristic amount and the second characteristic amount to determine whether a predetermined condition is satisfied or not; and a volume control means for controlling an output level when outputting an audio of the television signal on the basis of a result of the comparison determining means.

According to the aspect of the television receiver of the present invention, the comparison determining means compares the first characteristic amount which is an audio characteristic amount of the television signal before the time when the video audio changing point is detected and the second characteristic amount which is an audio characteristic amount of the television signal after the time when the video audio changing point is detected to determine whether a predetermined condition is satisfied or not, and a volume control means controls the output level when outputting the audio of the television signal on the basis of the result of the comparison determining means, thereby allowing to discriminate the CM broadcast from the received television broadcast and to control a volume of the CM broadcast without complicating a configuration of a discriminating process of the CM broadcast.

These and other objects, features, aspects and advantages of the present invention will become more apparent from the following detailed description of the present invention when taken in conjunction with the accompanying drawings.

BEST MODE FOR CARRYING OUT THE INVENTION

First Preferred Embodiment

Figure 1:
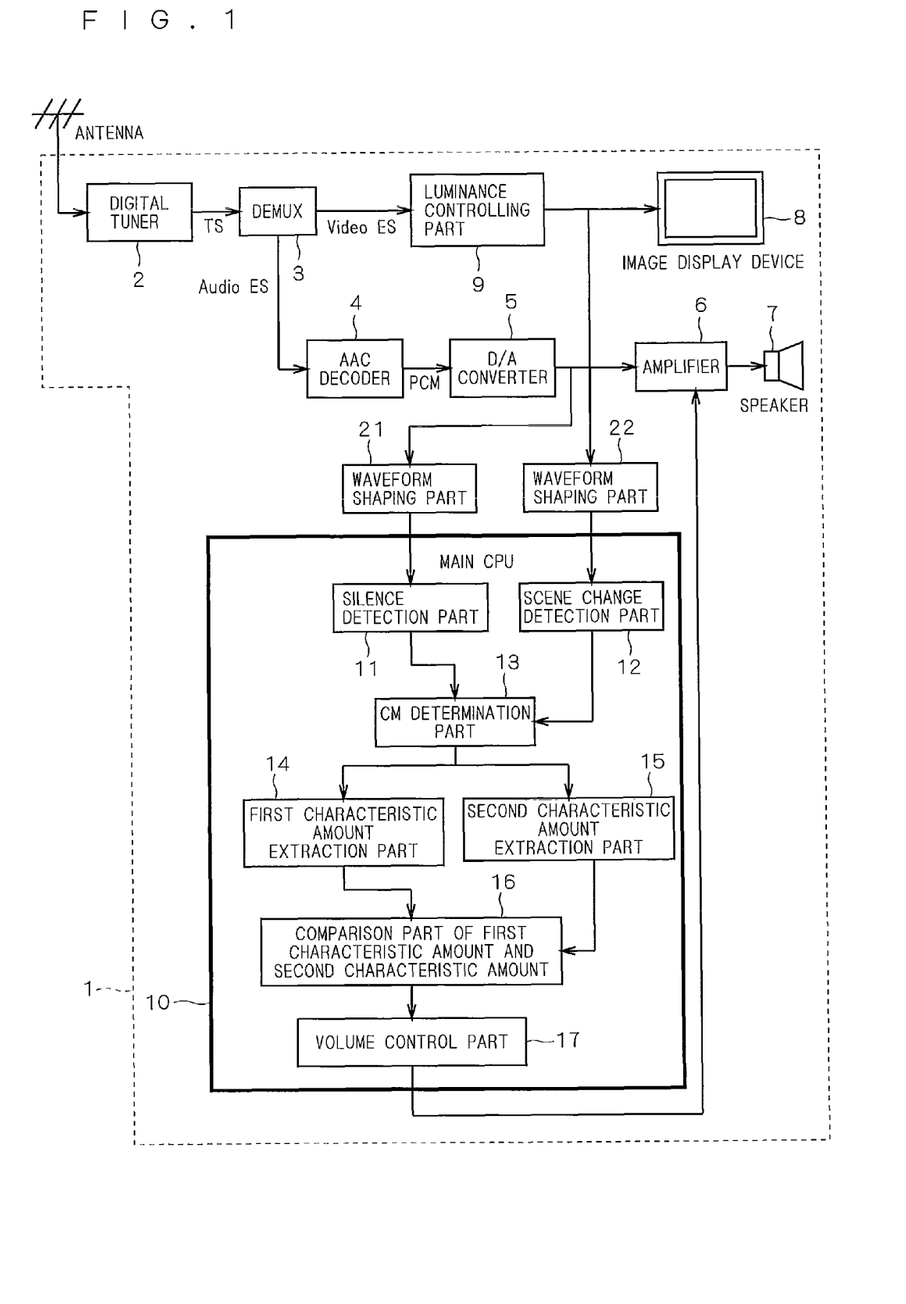
FIG. 1 is a system block diagram of a television receiver 1 according to a first preferred embodiment of the present invention.

FIG. 1 is a system block diagram of a television receiver 1 according to the present embodiment. Hereinafter, a method for discriminating a CM broadcast to control a volume will be described using a system block diagram shown in FIG. 1.

First, the television receiver 1 shown in FIG. 1 receives a television signal of a digital broadcast via an antenna with a digital tuner 2. A TS (Transport) stream output from the digital tuner 2 is demultiplexed to audio data (Audio Elementary Stream) and vide data (Video Elementary Stream) in a DEMUX (demultiplexer) 3.

An AAC (Advanced Audio Cording) decoder 4 converts the demultiplexed audio data (Audio ES) into PCM data to be audio digital data, and further a D/A (Digital/Analog) converter 5 converts PCM data into analog audio data. One of the converted analog audio data is output from a speaker 7 as audio through an amplifier (AMP) 6 for controlling volume, and the other is input to a main CPU 10.

One of the demultiplexed video data (Video ES) is input to an image display device 8 after a predetermined signal processing to display an image, and the other is input to the main CPU 10 after the predetermined signal processing. The predetermined signal processing is a process to be needed for displaying an image on the image display device 8, and FIG. 1 shows a luminance controlling part 9 for generating a signal controlling luminance of the image display device 8 on the basis of the image data.

The television receiver 1 according to the present embodiment performs a discriminating process of the CM broadcast by inputting analog audio data and video data to the main CPU 10 to perform a process. The television receiver 1 shown in FIG. 1 uses the main CPU 10 for the discriminating process of the CM broadcast, but the present invention is not limited to this, and may perform the process by providing a dedicated computing device such as DSP (Digital Signal Processor) or the like.

First, the analog audio data output from the D/A converter 5 is shaped to a waveform in a waveform shaping part 21 to enable a data processing in the main CPU 10, and then is input to the main CPU 10. Similarly, the video data output from the luminance controlling part 9 (luminance controlling data) is shaped to a waveform in a waveform shaping part 22 to enable a data processing in the main CPU 10, and then is input to the main CPU 10.

In the main CPU 10, a silence detection part 11 determines a silence period on the basis of the audio data output from the waveform shaping part 21. On the other hand, a scene change detection part 12 detects a scene changing point where a scene changes on the basis of the luminance controlling data output from the waveform shaping part 22. Further, a CM determination part 13 determines a time when the silence period from the silence detection part 11 and the scene changing point from the scene change detection part 12 are simultaneously detected as a starting point of the CM broadcast. That is, the television receiver 1 according to the present embodiment regards a video audio changing point in which video and audio simultaneously change as the starting point of the CM broadcast, and the CM determination part 13 is provided as a video audio changing point detection means for detecting the video audio changing point.

Next, when the CM determination part 13 detects the starting point of the CM broadcast, a first characteristic extraction part 14 extracts a first characteristic amount of an audio characteristic amount (e.g., volume data, audio energy or the like) from audio data in a certain period before the starting point of this CM broadcast and stores it. At the same time, a second characteristic extraction part 15 extracts a second characteristic amount of an audio characteristic amount (e.g., volume data, audio energy or the like) from audio data in a certain period after the starting point of this CM broadcast and stores it.

Furthermore, a comparison part 16 compares the extracted first characteristic amount and second characteristic amount, and determines existence or nonexistence of audio which sounds dissonant and loud during a period of the CM broadcast. When the comparison part 16 determines existence of audio which sounds dissonant and loud, a volume control part 17 which is a volume control means lowers a volume (output level) output from the speaker 7 by controlling the amplifier 6.

Figure 2:
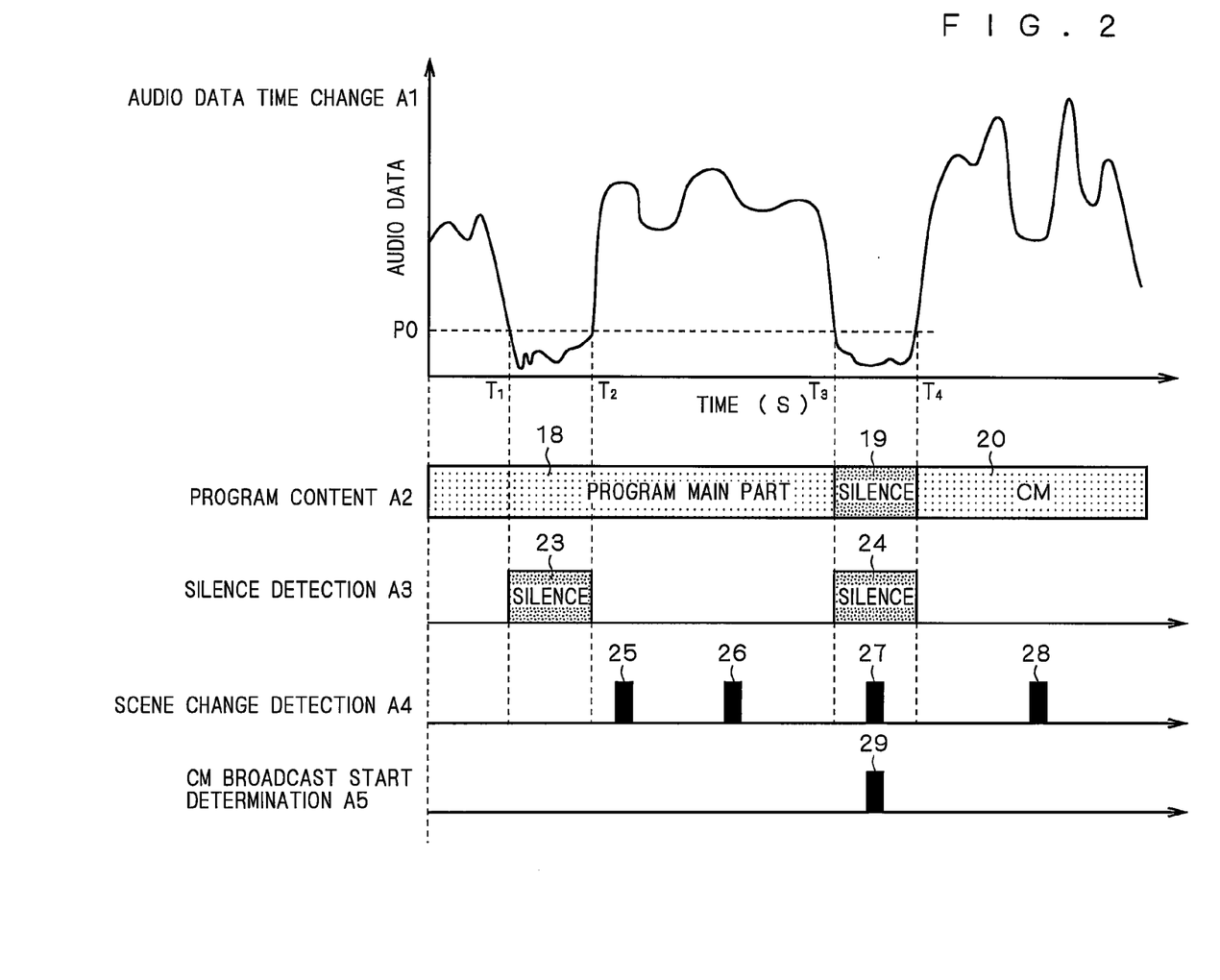
FIG. 2 is a schematic view of a television broadcast according to the first preferred embodiment of the present invention.

Next, the discriminating process of the CM broadcast in the main CPU 10 will be described using a schematic view of a television broadcast shown in FIG. 2. First, the schematic view shown in FIG. 2 illustrates each situation of an audio data time change A1, a program content A2, a silence detection A3, a scene change detection A4 and a CM broadcast start determination A5 on the same time axis. Here, the program content A2 shown in FIG. 2 shows a state where a program main part broadcast 18, a silence broadcast 19 and a CM broadcast 20 are sequentially broadcasted as time advances. The audio data time change A1 shows a state where magnitude of audio data changes as time passes, corresponding to the program content A2. In a graph of the audio data time change A1, when audio data with a value less than a threshold value P0 continues for a predetermined period, it is determined to be a silence period.

In the graph of the audio data time change A1 shown in FIG. 2, the audio data is less than or equal to the threshold value P0 between a time T1 and a time T2 and between a time T3 and a time T4, so that the silence detection part 11 shown in FIG. 1 detects the above periods as silence periods 23 and 24 shown in the silence detection A3. A predetermined period to be determined as a silence period in the silence detection A3 is to be, for example, 0.5 seconds.

Subsequently, the scene change detection part 12 shown in FIG. 1 detects a scene change of video by obtaining a luminance change of video data, and shows as scene changing points 25, 26, 27 and 28 in the scene change detection A4 of FIG. 2. In FIG. 2, the silence period 24 in the silence detection A3 and the scene changing point 27 are observed at the same time so that this time corresponds to the silence broadcast 19 before the CM broadcast 20. Therefore, the CM determination part 13 shown in FIG. 1 determines the time when the silence period 24 and the scene changing point 27 are simultaneously observed as a starting point 29 of the CM broadcast shown in the CM broadcast start determination A5. The silence period 23 is determined as a silence section in a program since it does not overlap a scene changing point. That is, the television receiver 1 according to the present embodiment discriminates the CM broadcast 20 from the program main part broadcast 18 using the starting point 29 of the CM broadcast.

Figure 3:
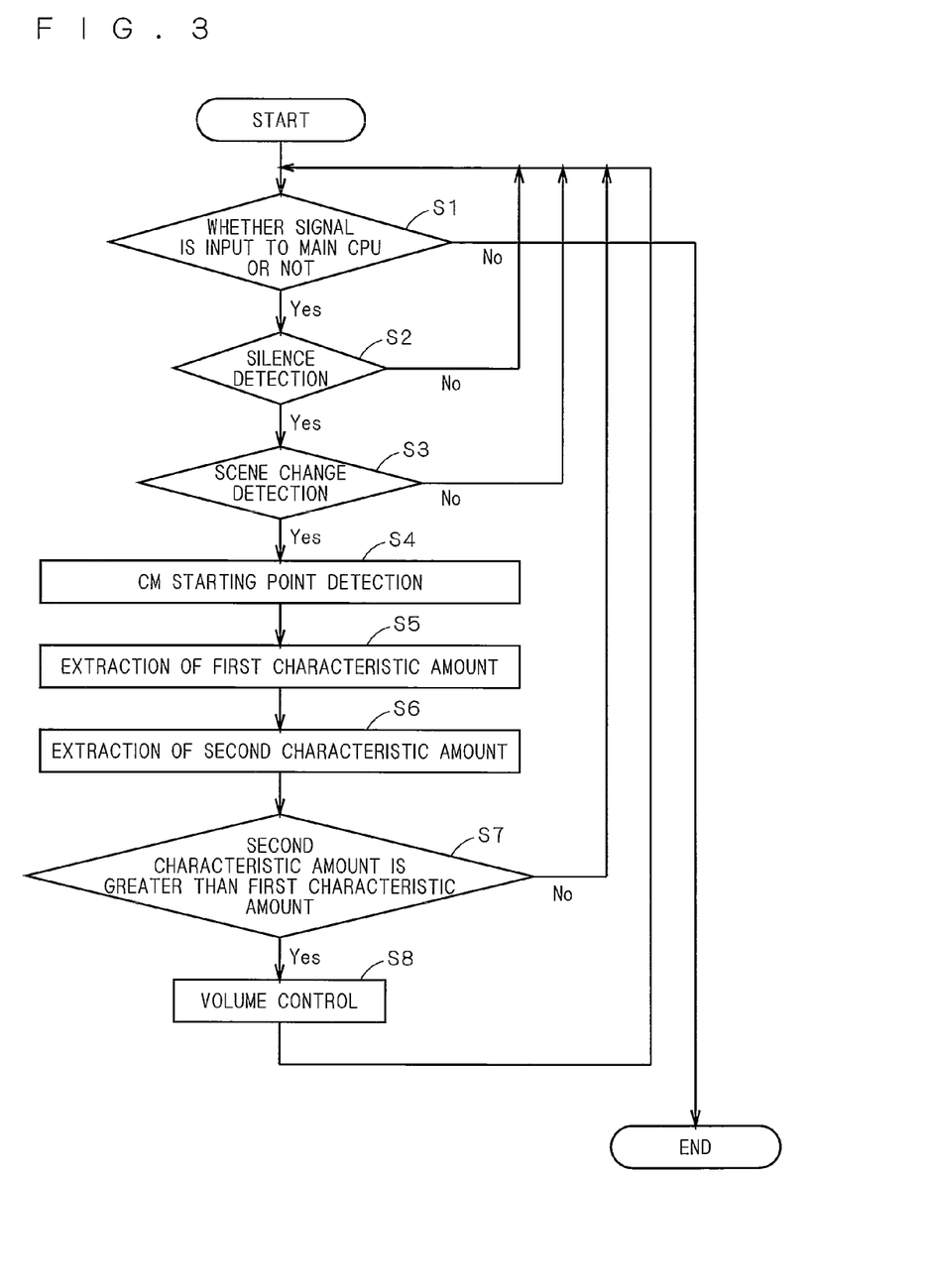
FIG. 3 is a flow chart for showing an operation of the television receiver 1 according to the first preferred embodiment of the present invention.

Next, a flow chart of an operation in the main CPU 10 is shown in FIG. 3. According to the flow chart shown in FIG. 3, whether analog audio data and video data is input to the main CPU 10 or not is determined in a step S1 to proceed to a step S2 if it is input, and go to an end if it is not input. In the step S2, the silence period is detected from the audio data to proceed to a step S3 if it is detected, and return to the step S1 if it is not detected. In the step S3, a scene change (scene changing point) is detected from the video data to proceed to a step S4 if it is detected, and return to the step S1 if it is not detected.

In the step S4, a starting point of the CM broadcast is detected on the basis of the silence period detected in the step S2 and the scene changing point detected in the step S3. Further, a first characteristic amount is extracted from the audio data in a step S5, and a second characteristic amount is extracted from the audio data in a step S6. In a step S7, the first characteristic amount is compared to the second characteristic amount to proceed to a step S8 if the second characteristic amount is no less than the first characteristic amount, and return to the step S1 the rest of the case. A volume control is performed in the step S8 on the basis of the comparison result of the step S7. The process of the flow chart shown in FIG. 3 is repeated while the television receiver 1 is operating, that is, as long as signal input to the main CPU 10 continues. The extraction of the first characteristic amount is not necessarily performed after the detection of the starting point 29 of the CM broadcast as described above, but it may be configured in a manner that the extraction and storing of the first characteristic amount is constantly performed before the detection of the starting point 29 of the CM broadcast to select the first characteristic amount obtained immediately before the starting point 29 of the CM broadcast is detected for using to compare with the second characteristic amount.

From the above, the television receiver 1 according to the present embodiment allows to accurately determine the starting point of the CM broadcast by detecting the silence period and scene changing point even if the program main part broadcast 18 and the CM broadcast 20 are in the same broadcast system. Further, the television receiver 1 according to the present embodiment allows to control a volume of the CM broadcast which sounds dissonant and loud by comparing audio characteristic amounts before and after the silence broadcast which is to be the starting point of the CM broadcast.

Second Preferred Embodiment

The television receiver 1 according to the first preferred embodiment lowers a volume by controlling the volume during a period of the CM broadcast as described above. Further, the television receiver 1 according to the present embodiment incorporates a program in which the volume control part recovers the lowered volume within a predetermined period in the main CPU 10 shown in FIG. 1. An operation of this program will be described using a schematic view of the television broadcast shown in FIG. 4.

Figure 4:
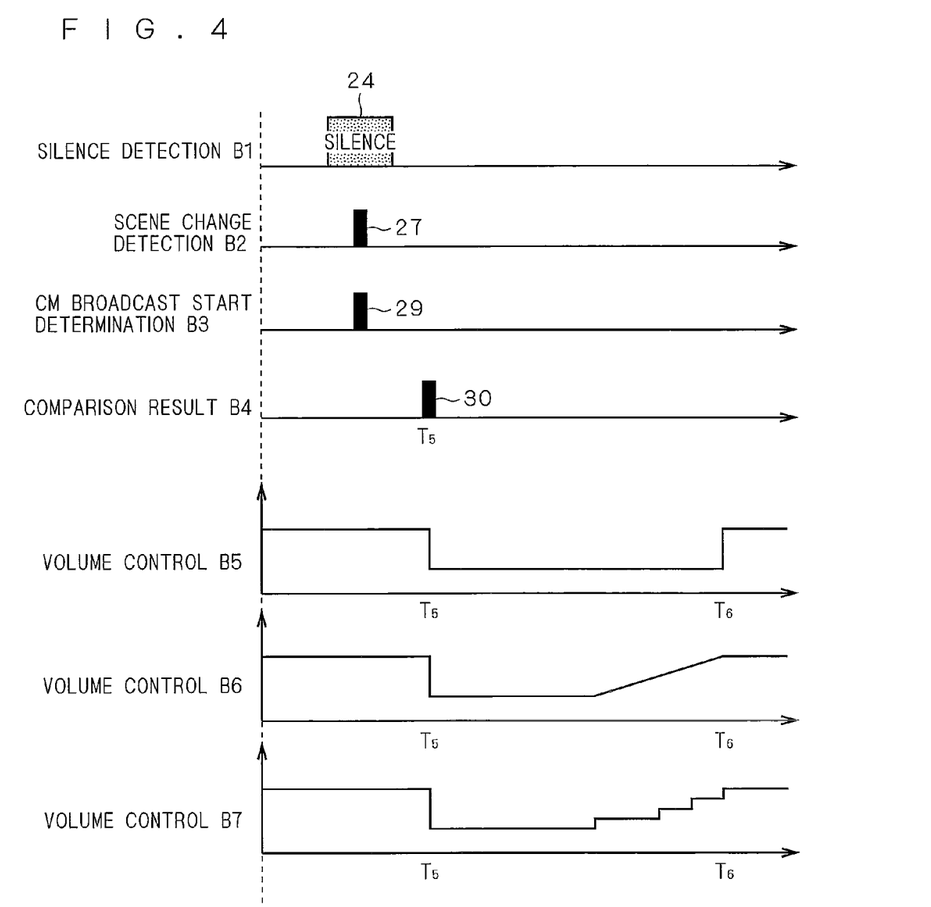
FIG. 4 is a schematic view of a television broadcast according to a second preferred embodiment of the present invention.

The schematic view shown in FIG. 4 shows each situation of a silence detection B1, a scene change detection B2, a CM broadcast start determination B3 and a comparison result B4. Further, the schematic view shown in FIG. 4 illustrates three patterns of volume controls B5, B6 and B7 performed in the volume control part 17 on the same time axis as B1 to B4.

First, in the schematic view shown in FIG. 4, when a scene changing point 27 in the scene change detection B2 is simultaneously detected in the silence period 24 of the silence detection B1, a starting point 29 of the CM broadcast is to be detected in the CM broadcast start determination B3. Further, a volume control point 30 obtained by comparing the first characteristic amount and the second characteristic amount is shown in the comparison result B4 of the schematic view shown in FIG. 4, letting a time of the volume control point 30 be T5. The volume control part 17 lowers a volume from a point of the time T5.

In a pattern of a volume control B5 shown in FIG. 4, a volume is lowered by the volume control part 17 from the time T5 after the starting point 29 of the CM broadcast which is determined that the dissonant CM broadcast starts. Further, in the pattern of the volume control B5 shown in FIG. 4, the volume is recovered to the volume before being lowered in a time T6 after a certain time passes. Here, in the time T5, the volume is instantly lowered in accordance with audio input of the dissonant CM broadcast. On the other hand, the volume is rapidly returned to its original state in the time T6.

However, as the pattern of the volume control B5 shown in FIG. 4, a rapid change of the volume in the time T6 may bring discomfort depending on a situation of the CM broadcast.

Thus, in a pattern of a volume control B6 shown in FIG. 4, after the volume is lowered in the time T5, the volume is successively returned to its original volume as it comes closer to the time T6. Also, in a pattern of a volume control B7 shown in FIG. 4, after the volume is lowered in the time T5, the volume is returned to its original volume in a phased manner as it comes closer to the time T6.

When the volume is controlled by such patterns of volume controls B6 and B7 shown in FIG. 4, the lowered volume is gradually (successively or in a phased manner) recovered so that the volume control is performed without discomfort, comparing to the pattern of the volume control B5. The patterns of the above-described volume controls can be handled by incorporating the above function to the volume control part 17.

Third Preferred Embodiment

The television receiver 1 according to the first preferred embodiment lowers a volume by controlling the volume during a period of the CM broadcast as described above. Further, the television receiver 1 according to the present embodiment incorporates a program in which the volume control part recovers the lowered volume within fifteen seconds in the main CPU 10 shown in FIG. 1. An operation of this program will be described using a schematic view of the television broadcast shown in FIG. 5.

Figure 5:
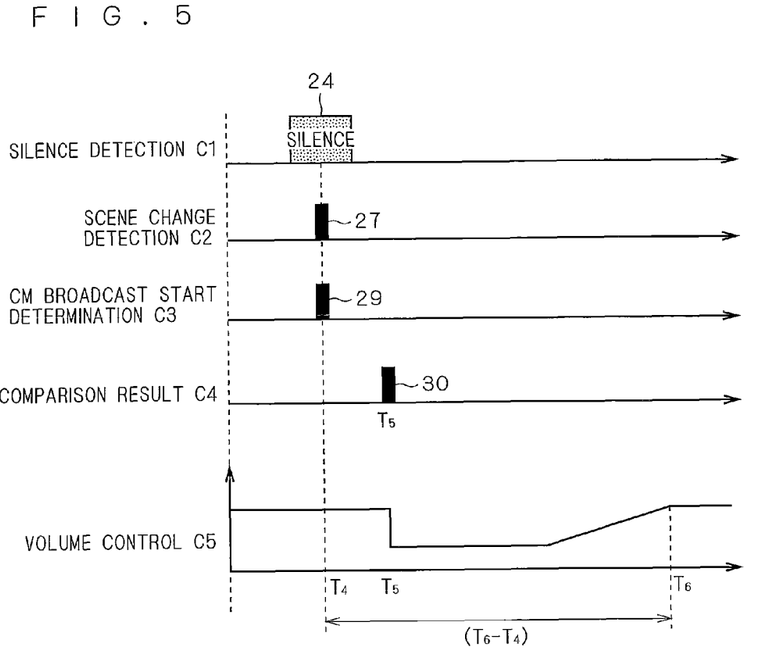
FIG. 5 is a schematic view of a television broadcast according to a third preferred embodiment of the present invention.

The schematic view shown in FIG. 5 shows each situation of a silence detection C1, a scene change detection C2, a CM broadcast start determination C3 and a comparison result C4. Further, the schematic view shown in FIG. 5 illustrates a pattern of a volume control C5 performed in the volume control part 17 on the same time axis as C1 to C4.

Similarly to the second preferred embodiment, in the schematic view shown in FIG. 5, when a scene changing point 27 in the scene change detection C2 is simultaneously detected in a silence period 24 of the silence detection C1, a starting point 29 of the CM broadcast is to be detected in the CM broadcast start determination C3. Further, a volume control point 30 obtained by comparing the first characteristic amount and the second characteristic amount is shown in the comparison result C4 of the schematic view shown in FIG. 5, letting a time of the volume control point 30 be T5. The volume control part 17 performs a process to lower a volume from a point of the time T5. The volume lowered in the time T5 is successively returned to its original volume while reaching to the time T6.

In the present embodiment, a period from the time T4 when the silence period 24 is detected to the time T6 of returning to its original volume is regarded as a volume correction period, and a period between (T6-T4) is controlled to be within fifteen seconds by a timer function provided in the main CPU 10.

As described above, the television receiver 1 according to the present embodiment sets a period from the starting point 29 of the CM broadcast to a completion of the volume control to be within fifteen seconds. The CM broadcast is generally constituted by the units of fifteen seconds and thirty seconds, so that the television receiver 1 according to the present embodiment allows a process of the volume control performed for each CM, for example, even when the CM broadcast is composed of successive fifteen-seconds CM.

Further, the television receiver 1 according to the present embodiment adopts the configuration shown in FIG. 1, and uses output from the D/A converter 5 before the first characteristic amount and the second characteristic amount of a volume are controlled, allowing discrimination of the CM broadcast without affection of the volume control during a CM broadcast period.

Fourth Preferred Embodiment

The television receiver 1 according to the present embodiment adopts the configuration shown in FIG. 1, and regards a volume characteristic amount processed in the main CPU 10 as volume data. Thus, each of the silence detection part 11, the CM determination part 13, the first characteristic amount extraction part 14, a second characteristic amount extraction part 15 and the comparison part 16 in the main CPU 10 according to the present embodiment is to process the volume data. The main CPU 10 retrieves volume data and video data in a certain decided timing. This timing is decided by an operation condition of a digital television, and the television receiver 1 according to the present embodiment will be described as retrieving data, for example, per 32 ms.

Figure 6:
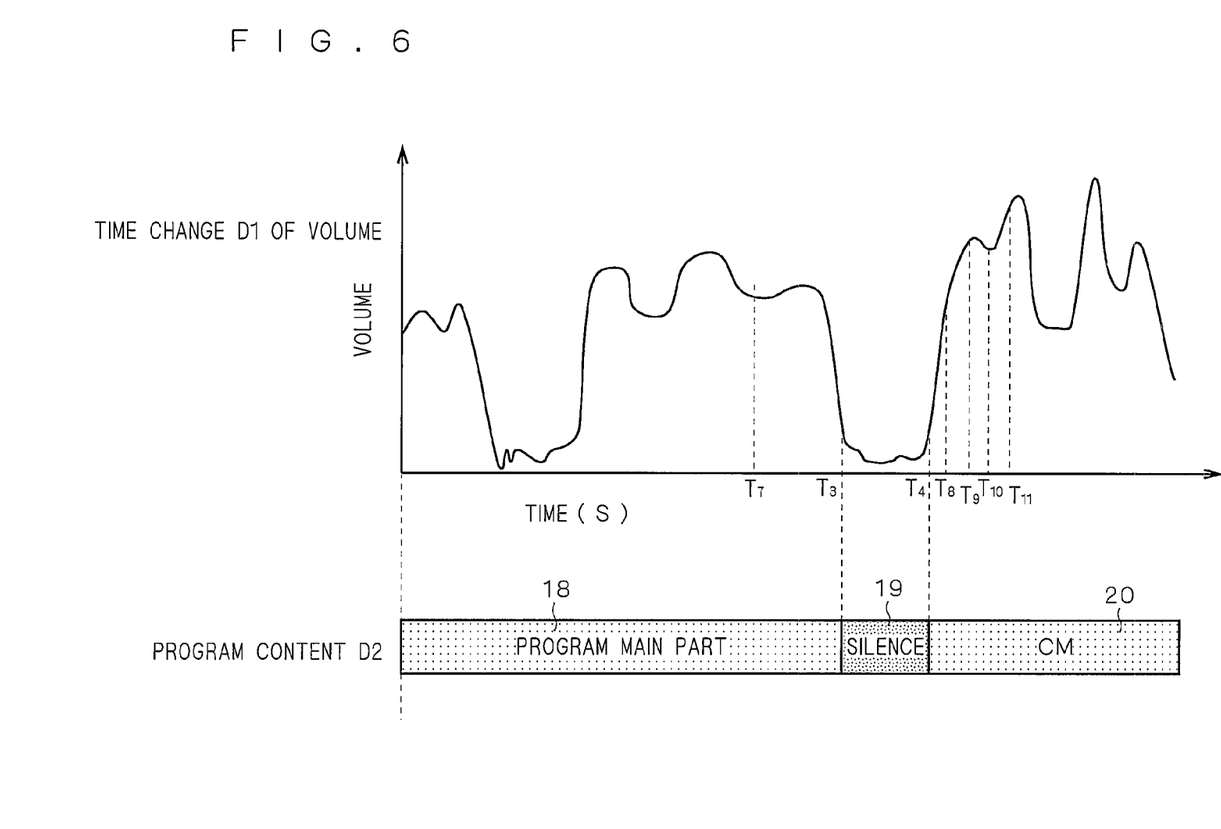
FIG. 6 is a schematic view of a television broadcast according to a fourth preferred embodiment of the present invention.

A schematic view of a television broadcast for showing a time change D1 of a volume and a program content D2 on the same time axis is shown in FIG. 6. The program content D2 shown in FIG. 6 broadcasts the program main part broadcast 18, the silence broadcast 19 and the CM broadcast 20 in this order. Also, the time change D1 of the volume shown in FIG. 6 shows volume data retrieved by the time unit per 32 ms.

When the television receiver 1 according to the present embodiment detects a starting point of the CM broadcast in the CM determination part 13, the first characteristic amount extraction part 14 traces back to a time T7 five seconds before a time T3 before starting the silence broadcast 19 shown in FIG. 6 to extract the volume data so as to obtain an average value. Specifically, there are 155 pieces of the volume data which are obtained per 32 ms within a period (about five seconds) from the time T7 to the time T3. The average values of these 155 pieces of the volume data becomes a first characteristic amount obtained by the first characteristic amount extraction part 14.

Next, the second characteristic amount extraction part 15 extracts audio data per 32 ms within a period from a time T4 when the CM broadcast 20 is started to a time T8 a second later to obtain an average value. Similarly, the second characteristic extraction part 15 extracts the audio data for each period of a time from the time T8 to a time T9 a second later, a period from the time T9 to a time T10 a second later and a period from the time T10 to a time T11 a second later to obtain an average value. Specifically, 31 pieces of the audio data per 32 ms can be extracted for each period from the time T4 to the time T8, from the time T8 to the time T9, from the time T9 to the time T10 and from the time T10 to the time T11. An average value for each period is obtained to be a second characteristic amount for each period in the present embodiment.

Accordingly, in the television receiver 1 according to the present embodiment, the average value of the volume data for five seconds before the silence broadcast 19 stored in the first characteristic extraction amount part 14 and the average value of the volume data per second after the silence broadcast 19 stored in the second characteristic extraction amount 15 are compared in the comparison part 16. Thereby, the television receiver 1 according to the present embodiment allows a comparison of a level of a dissonant volume on the basis of average volume data in a certain section.

Further, the television receiver 1 according to the present embodiment does not necessarily obtains the average value of the volume data for each period from the time T7 to the time T3, from the time T4 to the time T8, from the time T8 to the time T9, from the time T9 to the time T10, and from the time T10 to the time T11, but may obtain a maximum value of each period as the first characteristic amount and the second characteristic amount. Thereby, the maximum value is used for comparing the volume before and after the starting point of the CM broadcast, allowing a comparison in view of a magnitude of an instant volume.

Fifth Preferred Embodiment

Figure 7:
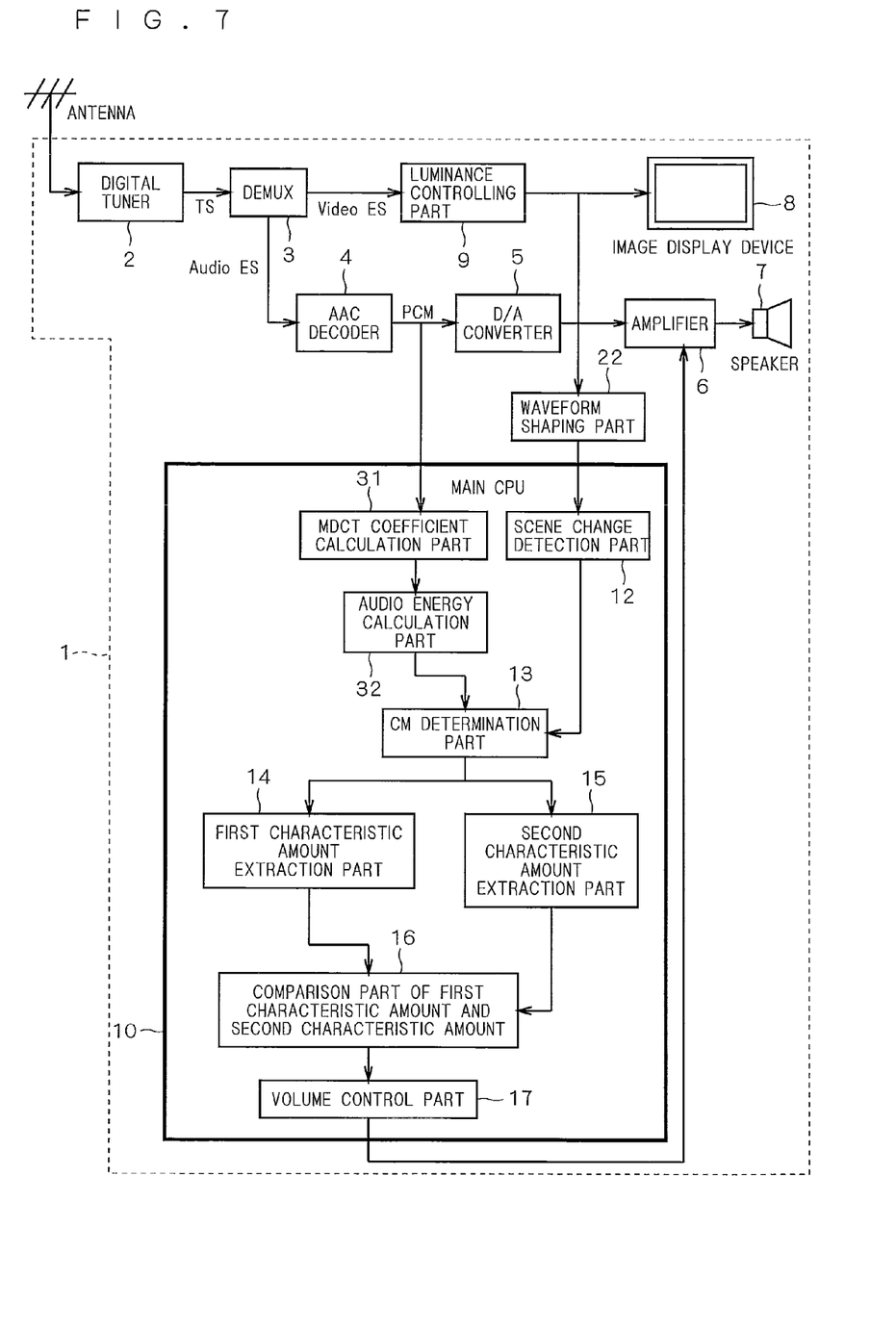
FIG. 7 is a system block diagram of a television receiver 1 according to a fifth preferred embodiment of the present invention.

FIG. 7 shows a system block diagram of a television receiver 1 according to the present embodiment. The television receiver 1 according to the present embodiment processes PCM data output from the AAC decoder 4 by inputting directly to the main CPU 10, being different from the television receiver 1 shown in FIG. 1. Thus, the television receiver 1 regards an audio characteristic amount processed in the main CPU 10 not as volume data but as audio energy.

In the main CPU 10 shown in FIG. 7, a MDCT coefficient calculation part 31 orthogonally transforms input PCM data of a time domain into a frequency domain. As for the orthogonal transformation, MDCT (Modified Discrete Cosine Transform) temporally overlapping by 50% of PCM data is used. Samples of 512 pieces of PCM data are taken to obtain 256 pieces of orthogonal transform coefficients (MDCT coefficient) for each of a right channel and a left channel in order to make an overlapping by 50%.

Next, an audio energy calculation part 32 calculates a square sum of a coefficient value of 256 pieces of the orthogonal transform coefficients (MDCT coefficient) obtained in the MDCT coefficient calculation part 31, for example, per one audio frame (32 ms) interval as audio energy in the concerned section.

The television receiver 1 according to the present embodiment shown in FIG. 7 performs a process of the CM determination part 13, the first characteristic amount extraction part 14, the second characteristic amount extraction part 15 and the comparison part 16 on the basis of the audio energy output from the audio energy calculation part 32. That is, the television receiver 1 according to the present embodiment performs a process of the CM determination 13 or the like using the audio energy, instead of analog audio data. As for the television receiver 1 shown in FIG. 7, same reference numbers are applied for same components as the television receiver 1 shown in FIG. 1, and the detailed explanation will be omitted.

As described above, the television receiver 1 according to the present embodiment allows a direct process of digital data using the audio energy calculated in the main CPU 10, promising improvement on accuracy of detection and discrimination of the CM broadcast. Also, since the television receiver 1 according to the present embodiment retrieves PCM data into the main CPU 10, an analog circuit or the like to be a waveform shaping part is not needed.

Figure 8:
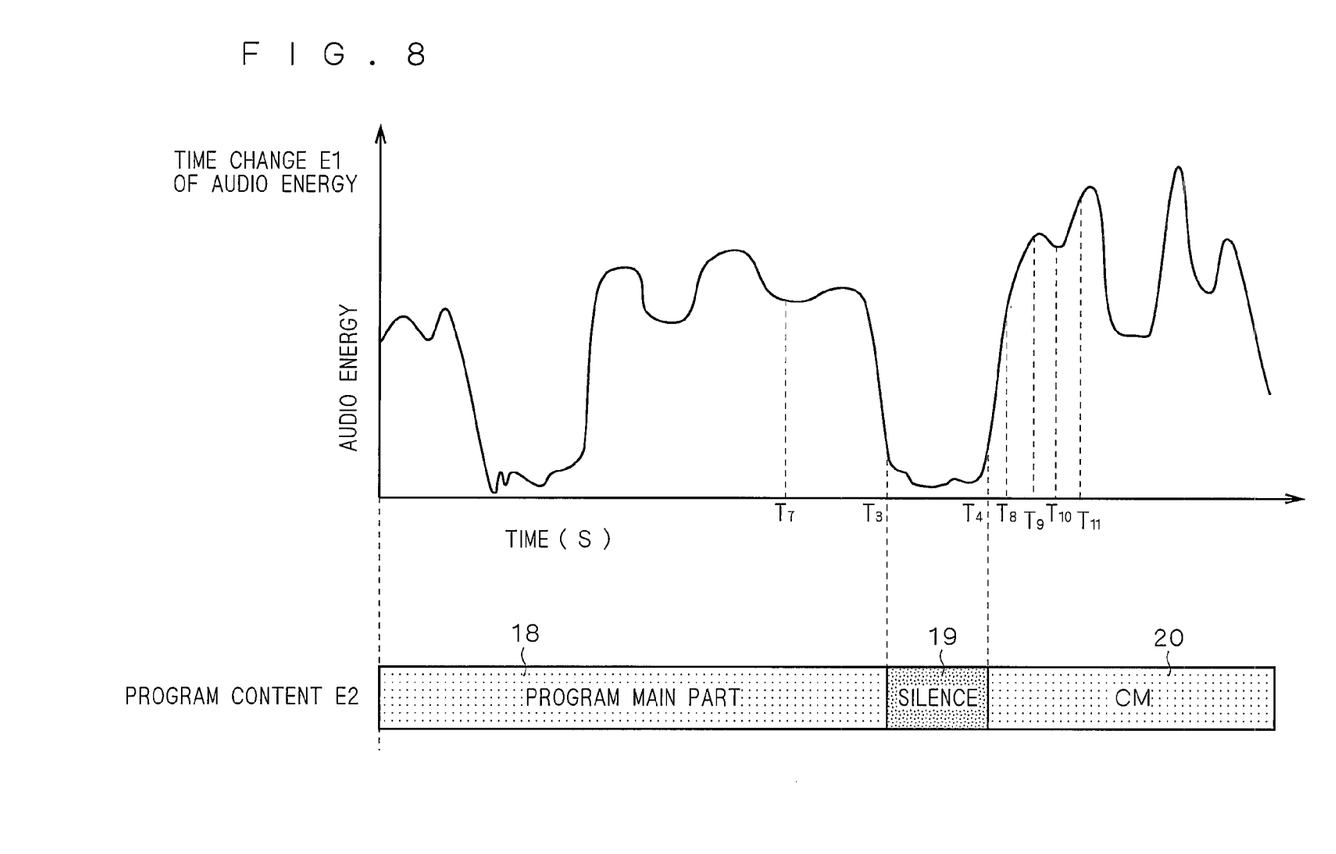
FIG. 8 is a schematic view of a television broadcast according to the fifth preferred embodiment of the present invention.

Next, an operation of the television receiver 1 according to the present embodiment will be described. First, FIG. 8 shows a schematic view of the television broadcast in which a time change E1 of the audio energy and a program content E2 are illustrated on the same time axis. The program content E2 shown in FIG. 8 broadcasts the program main part broadcast 18, the silence broadcast 19 and the CM broadcast 20 in this order. Also, the time change E1 of the audio energy in FIG. 8 shows the audio energy retrieved by the time unit per 32 ms. The processes after the CM determination part 13 shown in FIG. 7 can be performed similarly to the processes of the volume data.

When the television receiver 1 according to the present embodiment detects a starting point of the CM broadcast in the CM determination part 13, the first characteristic amount extraction part 14 traces back to a time T7 five seconds before a time T3 before starting the silence broadcast 19 shown in FIG. 8 to extract the audio energy so as to obtain an average value. Specifically, there are 155 pieces of the audio energy which are obtained per 32 ms within a period (about five seconds) from the time T7 to the time T3. The average values of these 155 pieces of the audio energy becomes a first characteristic amount obtained by the first characteristic amount extraction part 14.

Next, the second characteristic amount extraction part 15 extracts the audio energy per 32 ms within a period from a time T4 when the CM broadcast 20 is started to a time T8 a second later to obtain an average value. Similarly, the second characteristic extraction part 15 extracts the audio energy for each period of a time from the time T8 to a time T9 a second later, a period from the time T9 to a time T10 a second later and a period from the time T10 to a time T11 a second later to obtain an average value. Specifically, 31 pieces of the audio data per 32 ms can be extracted for each period from the time T4 to the time T8, from the time T8 to the time T9, from the time T9 to the time T10 and from the time T10 to the time T11. An average value for each period is obtained to be a second characteristic amount for each period in the present embodiment.

Accordingly, in the television receiver 1 according to the present embodiment, the average value of the audio energy for five seconds before the silence broadcast 19 stored in the first characteristic extraction amount part 14 and the average value of the audio energy per second after the silence broadcast 19 stored in the second characteristic extraction amount 15 are compared in the comparison part 16. Thereby, the television receiver 1 according to the present embodiment allows a comparison of a level of a dissonant volume on the basis of average audio energy in a certain section.

Further, the television receiver 1 according to the present embodiment does not necessarily obtains the average value of the audio energy for each period from the time T7 to the time T3, from the time T4 to the time T8, from the time T8 to the time T9, from the time T9 to the time T10, and from the time T10 to the time T11, but may obtain a maximum value of the audio energy for each period as the first characteristic amount and the second characteristic amount. Thereby, the maximum value of the audio energy is used for comparing the volume before and after the starting point of the CM broadcast, allowing a comparison in view of a magnitude of an instant volume.

Sixth Preferred Embodiment

In the television receiver 1 shown in FIG. 1, the comparison part 16 of the main CPU 10 compares the first characteristic amount which is volume data and the second characteristic amount which is volume data. On the other hand, in the television receiver 1 shown in FIG. 7, the comparison part 16 of the main CPU 10 compares the first characteristic amount which is audio energy and the second characteristic amount which is audio energy. That is, in the fourth preferred embodiment, the average value or the maximum value of the volume data is employed for the first characteristic amount and the second characteristic amount, and in the fifth preferred embodiment, the average value or the maximum value of the audio energy is employed for the first characteristic amount and the second characteristic amount. When the first characteristic amount is compared to the second characteristic amount in the comparison part 16, a type of the first characteristic amount and the second characteristic amount is needed to be unified to whether it is volume data or audio energy, but either of the maximum value or the average value may be employed.

The comparison part 16 shown in FIG. 1 and the comparison part 16 shown in FIG. 7 determine whether a value of volume data or audio energy of the second characteristic amount is no less than the that of the first characteristic amount or not. However, the television receiver 1 according to the present invention is not limited to this, but may determine whether the second characteristic amount is no less than a value obtained by multiplying the first characteristic amount by a coefficient or not. For instance, if the coefficient is two, whether the second characteristic amount having a value of volume data or audio energy which is twice as much as the first characteristic amount is input or not, is determined.

As such, when the comparison part 16 determines the second characteristic amount to the first characteristic amount, a volume of the dissonant CM broadcast to the program main part can be appropriately lowered by an employing method of a characteristic amount (an average value or a maximum value of volume and audio energy) and setting a determination coefficient of the characteristic amount.

Seventh Preferred Embodiment

Figure 9:
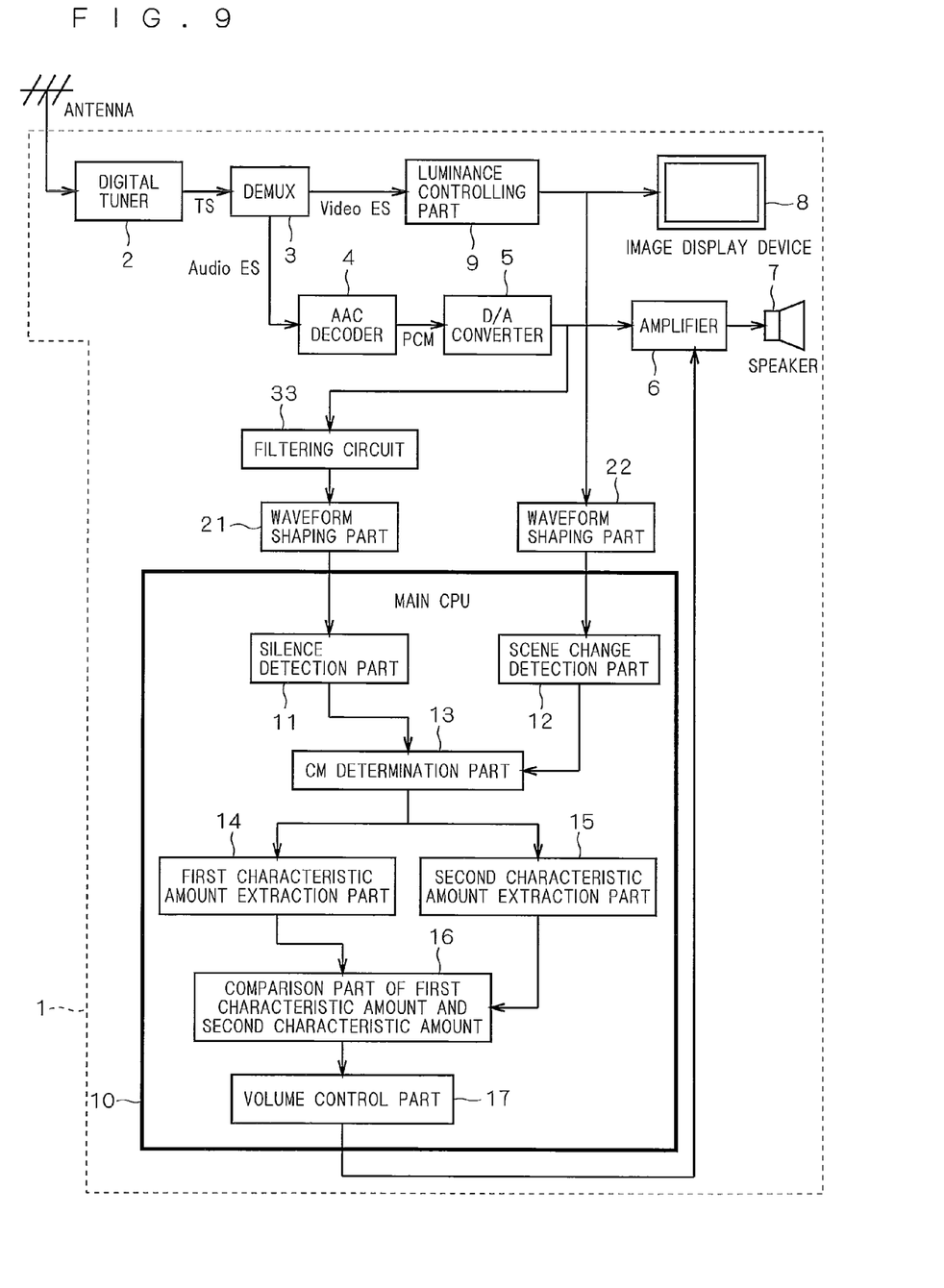
FIG. 9 is a system block diagram of a television receiver 1 according to a seventh preferred embodiment of the present invention.

FIG. 9 shows a system block diagram of a television receiver 1 according to the present embodiment. The television receiver 1 shown in FIG. 9 provides a filtering circuit 33 before inputting analog audio data into the waveform shaping part 21. This filtering circuit 33 has a function to pass only analog audio data having a specific frequency characteristic through the waveform shaping part 21. Accordingly, the television receiver 1 according to the present embodiment can restrict the frequency characteristic of audio data processed in the main CPU 10.

Figure 10:
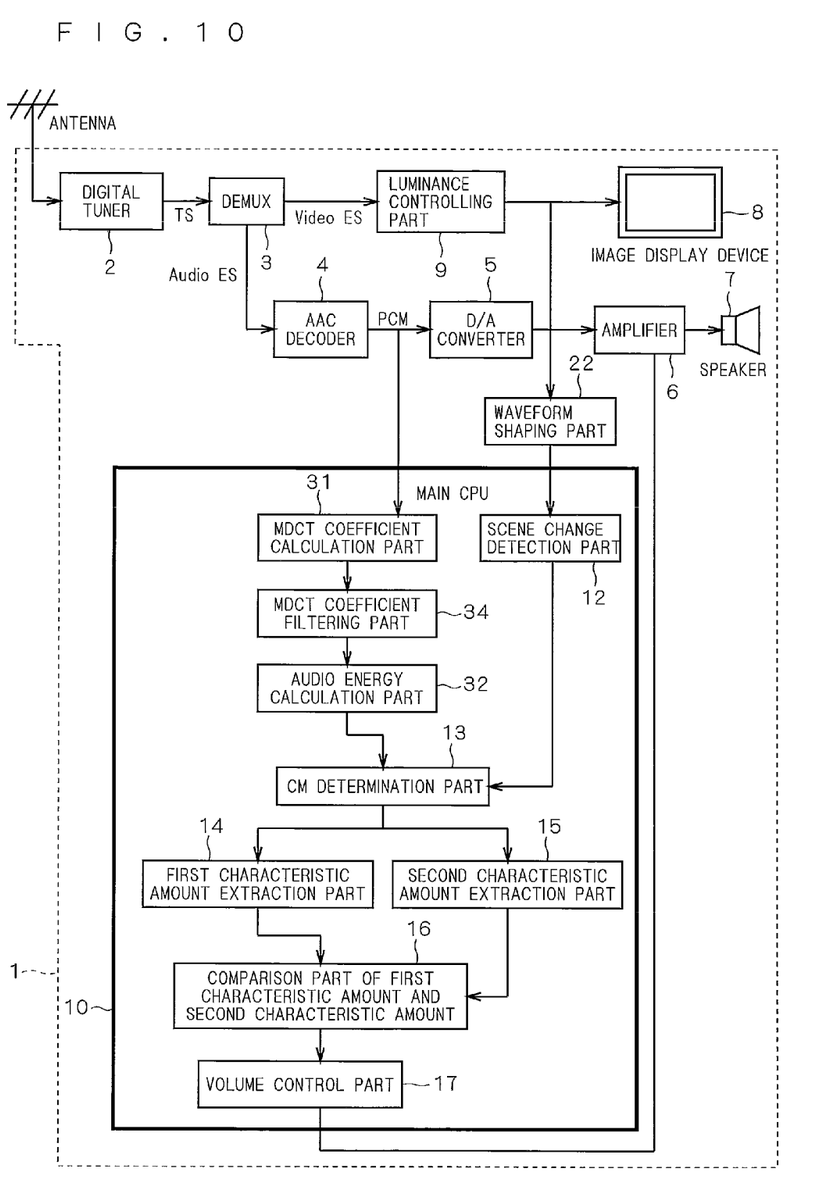
FIG. 10 is a system block diagram of a television receiver 1 according to a variation of the seventh preferred embodiment of the present invention.

FIG. 10 shows a system block diagram of a variation of the television receiver 1 according to the present embodiment. The main CPU 10 shown in FIG. 10 is configured to process audio energy, similarly to the configuration described in the fifth preferred embodiment. Therefore, the main CPU 10 shown in FIG. 10 is provided with a MDCT coefficient filtering part 34 for output of the MDCT coefficient calculation part 31 to calculate audio energy with a restricted frequency characteristic in the audio energy calculation part 52.

As described above, the television receiver 1 according to the present embodiment can perform a process only with audio data or audio energy having specific frequency characteristic by using the filtering circuit 33 or the MDCT coefficient filtering part 34, so that whether a volume is to be controlled or not is determined, limiting to a frequency band which sounds more dissonant and louder in the CM broadcast. Specifically, when the filtering circuit 33 and the MDCT coefficient filtering part 34 has a function to pass through a frequency domain to be a high pitch sound domain, the main CPU 10 determines whether the volume is to be controlled only for audio data or audio energy with the frequency domain to be a high pitch sound domain, allowing a volume control process, focusing on dissonant audio.

Eighth Preferred Embodiment

Figure 11:
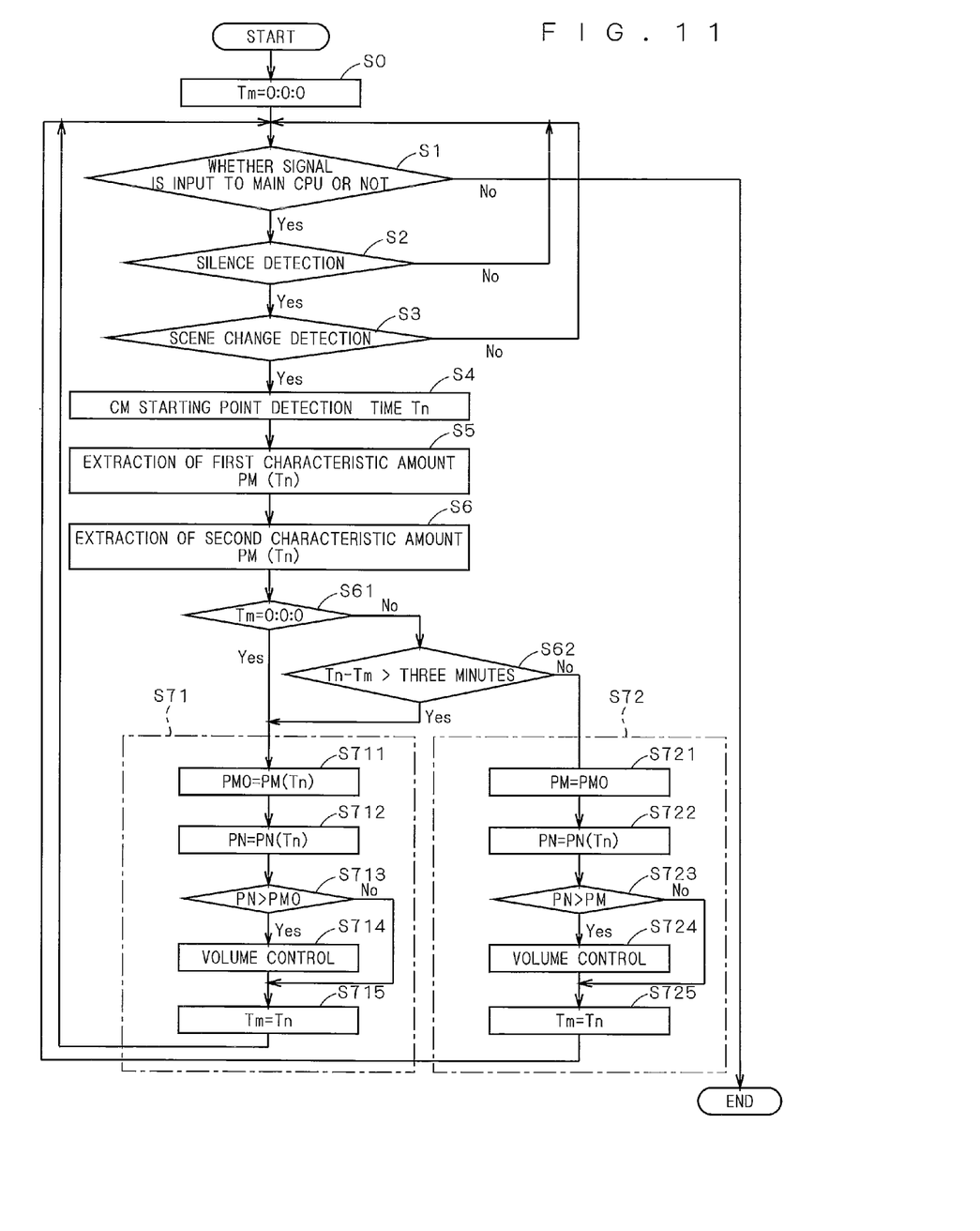
FIG. 11 is a flow chart for showing an operation of a television receiver 1 according to an eighth preferred embodiment of the present invention.

FIG. 11 shows a flow chart for illustrating an computing processing of the main CPU 10 in a television receiver 1 according to the present embodiment. A fundamental processing of the flow chart shown in FIG. 11 is same as the flow chart shown in FIG. 3, so that same reference numbers are applied to the same processing steps, omitting the detailed description.

First, in the flow chart shown in FIG. 11, before determining in a step S1 whether analog audio data and video data is input to the main CPU 10 or not, a time Tm is preset to a time 0:0:0 (0 hour, 0 minute and 0 second) (a step S0). A time when starting the operation of the television receiver 1, or a time when of the CM broadcast detected immediately before is set to this time Tm.

Next, in the flow chart shown in FIG. 11, a starting point of the CM broadcast is detected in a step S4 on the basis of a silence period detected in a step S2 and a scene changing point detected in a step S3, letting a time of the starting point of the CM broadcast to be a time Tn. The comparison process is divided for the first characteristic amount and the second characteristic amount using this time Tm and the time Tn in the flow chart shown in FIG. 11. Specifically, it proceeds to a step S71 from a step S61 when the time Tm is a time 0:0:0, and proceeds to a step S62 when the time is not a time 0:0:0. Then, it proceeds to the step S71 from the step S62 when the time Tn−the time Tm is no less than three minutes, and proceeds to a step S72 when it is no more than three minutes.

That is, when the time Tm is a time 0:0:0, or when the time Tn−the time Tm is no less than three minutes, the process of the step S71 is performed. In the step S71, volume data PM (Tn) in a predetermined period before the time Tn is firstly set as volume data PM0 of the first characteristic amount (a step S711). Further, volume data PN (Tn) in a predetermined period of the CM broadcast after the time Tn is set as volume data PN of the second characteristic amount (S712). In the step S713, the preset volume data PM0 of the first characteristic amount is compared to the volume data PN of the second characteristic amount, proceeding to a step S714 at the time of PN>PM0, and proceeding to a step S715 at the time of PN≦PM0.

In the step S714, a volume control is performed to lower a volume output from the speaker 7. In contrast, in the step S715, the time Tm is updated by the time Tn. That is, in the step S715, a time of the starting point of the CM broadcast detected immediately before is set to the time Tm.

Next, when the time Tn−the time Tm is no more than three minutes, the process of the step S72 is performed. In the step S72, the volume data PM0 set in the step S711 is firstly set to be volume data PM of the first characteristic amount (a step S721). Further, volume data PN (Tn) in a predetermined period of the CM broadcast is set as volume data PN of the second characteristic amount (a step S722). In the step S723, the preset volume data PM of the first characteristic amount is compared to the volume data PN of the second characteristic amount, proceeding to a step S724 at the time of PN>PM, and proceeding to a step S725 at the time of PN≦PM.

In the step S724, a volume control is performed to lower a volume output from the speaker 7. In contrast, in the step S725, the time Tm is updated by the time Tn. That is, in the step S725, a time of the starting point of the CM broadcast detected immediately before is set to the time Tm.

Figure 12:
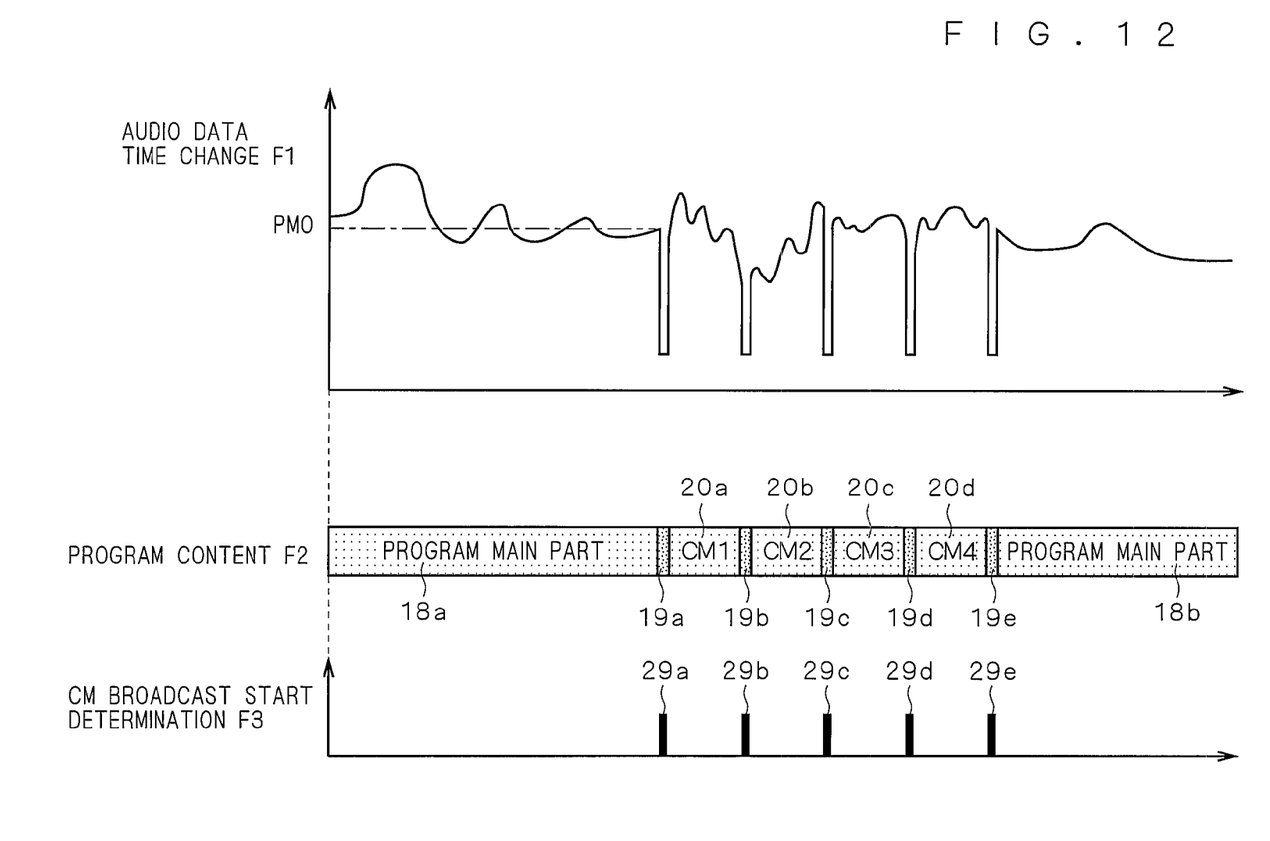
FIG. 12 is a schematic view of a television broadcast according to the eighth preferred embodiment of the present invention.

Next, the flow chart shown in FIG. 11 is specifically described using a schematic view of a television broadcast shown in FIG. 12. The schematic view shown in FIG. 12 shows a configuration where four CM broadcasts 20a to 20d are broadcasted with the silence broadcasts 19a to 19e interposed between the program main part broadcasts 18a and 18b in the program content F2. In the schematic view shown in FIG. 12, a time change F1 of audio data and a CM broadcast start determination F3 are illustrated on the same time axis.

In the schematic view shown in FIG. 12, the CM broadcast does not exist three minutes before the starting point 29a of the CM broadcast 20a, so that the time Tn−the time Tm is no less than three minutes, performing the process of the step S71. Each of the starting point 29b of the CM broadcast 20b, the starting point 29c of the CM broadcast 20c, the starting point 29d of the CM broadcast 20d and the starting point 29e of the program main part broadcast 18b appears for every fifteen seconds. Each of the CM broadcasts 20a to 20d is a fifteen-seconds CM.

In the process of the step S71 to the starting point 29a of the CM broadcast 20a, first, an average value or a maximum value of the volume data in a predetermined period before the starting point 29a (time Tn) is set as volume data PM0 of the first characteristic amount (a step S711). In the schematic view shown in FIG. 12, the volume data PM0 of the first characteristic amount is the average value of the volume data.

Further, the volume data PN of the second characteristic amount is set in the step S712, and the volume data PM0 of the first characteristic amount is compared with the volume data PN of the second characteristic amount in the step S713. The volume control is performed in the step S714 on the basis of a comparison result of the step S713. Next, the starting point 29a (time Tn) is set as the time Tm in the step S715.

Therefore, the next starting point 29b (time Tn) is to be compared with the time Tm of the starting point 29a in the step S62. The interval between the starting point 29b (time Tn) and the starting point 29a (time Tm) is fifteen seconds, which is no more than three minutes, so that the process of the step S72 is performed to the starting point 29b of the CM broadcast 20b. In the process of the step S72 to the starting point 29b of the CM broadcast 20b, the volume data PM0 set in the step S711 is set as the volume data PM of the first characteristic amount (a step S721).

Further, the volume data PN of the second characteristic amount is set in the step S722, and the volume data PM of the first characteristic amount is compared with the volume data PN of the second characteristic amount in the step S723. The volume control is performed in the step S724 on the basis of a comparison result of the step S723. Next, the starting point 29b (time Tn) is set as the time Tm in the step S725.

Hereinafter, the process of the step S72 is similarly performed to the starting point 29c of the CM broadcast 20c and the starting point 29d of the CM broadcast 20d. That is, the volume control process to the CM broadcasts 20b to 20d is performed, setting the volume data PM0 of the first characteristic amount which is set at the process of the CM broadcast 20a, as the volume data PM of the first characteristic amount.

Accordingly, when the CM broadcast is repeated within a predetermined period (e.g., within three minutes) the volume control process is performed holding the volume data before the CM broadcast (CM broadcast 20a in the case of FIG. 12) at the beginning is started, so that it is possible to perform a comparison process on the basis of the same volume data with respect to one CM broadcast section in which a plurality of the CM broadcasts are repeated.

In the television receiver 1 according to the present embodiment, a criterion between the CM broadcasts is set to be three minutes, but the present invention is not limited to this. Normal CM broadcasts are constituted with time intervals of fifteen seconds, thirty seconds, ninety seconds and a hundred and twenty seconds, and one successive CM broadcast section is regarded to end unless the CM broadcast is detected between the time interval of three minutes.

As described above, the television receiver 1 according to the present embodiment allows to collectively deal with a successive CM broadcast section. However, in the third preferred embodiment, the volume of the CM broadcast is controlled within fifteen seconds, determining how loud and dissonant the CM broadcast is for individual unit of the CM broadcasts. If the volume recovery time of the CM broadcast in the third preferred embodiment is set to be no less than or equal to fifteen seconds, and the present embodiment regarding the successive several CM broadcasts as one section is used, it is possible to control the volume of one CM broadcast section as a whole, without raising and lowering the volume per fifteen seconds.

While the invention has been shown and described in detail, the foregoing description is in all aspects illustrative and not restrictive. It is therefore understood that numerous modifications and variations can be devised without departing from the scope of the invention.

The invention claimed is:

1. A television receiver, comprising:
   silence detection means for detecting a silent part from an audio component of a received television signal;
   a scene change detection means for detecting a scene change part from a video component of said television signal;
   a video audio changing point detection means for detecting a time when said silent part and said scene change part are simultaneously detected, as a video audio changing point;
   a first characteristic amount extraction means for extracting and holding an audio characteristic amount of said television signal before the time when said video audio changing point is detected, as a first characteristic amount;
   a second characteristic amount extraction means for extracting and holding an audio characteristic amount of said television signal after the time when said video audio changing point is detected, as a second characteristic amount;
   a comparison determining means for comparing said first characteristic amount and said second characteristic amount to determine whether a predetermined condition is satisfied or not; and
   a volume control means for controlling an output level when outputting audio of said television signal on the basis of a result of said comparison determining means.

2. The television receiver according to claim 1, wherein when said comparison determining means determines that said predetermined condition is satisfied, said volume control means lowers said output level and thereafter controls to gradually recover to said output level before being lowered within a predetermined period.

3. The television receiver according to claim 1, wherein said predetermined period is fifteen seconds.

4. The television receiver according to claim 1, wherein said first characteristic amount and said second characteristic amount are average values or a maximum values of audio data.

5. The television receiver according to claim 1, wherein said first characteristic amount and said second characteristic amount are average values or maximum values of audio energy.

6. The television receiver according to claim 1, wherein said predetermined condition in said comparison determining means is that the second characteristic amount is no less than the first characteristic amount.

7. The television receiver according to claim 1, further comprising:
   filtering means for passing only said first characteristic amount and said second characteristic amount in a predetermined frequency band through said comparison determining means, wherein
   said comparison determining means compares and determines on the basis of only said first characteristic amount and said second characteristic amount in said predetermined frequency band.

8. The television receiver according to claim 1, wherein when said video audio changing point detection means detects a plurality of said video audio changing points within a predetermined period, said first characteristic amount extraction means holds said first characteristic amount that is firstly detected, within said predetermined period.

* * * * *